(12) United States Patent
Deisher et al.

(10) Patent No.: US 7,224,981 B2
(45) Date of Patent: May 29, 2007

(54) SPEECH RECOGNITION OF MOBILE DEVICES

(75) Inventors: Michael E. Deisher, Hillsboro, OR (US); Robert C. Knauerhase, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 10/176,326

(22) Filed: Jun. 20, 2002

(65) Prior Publication Data
US 2003/0236099 A1 Dec. 25, 2003

(51) Int. Cl.
*H04Q 7/20* (2006.01)
*G10L 15/00* (2006.01)

(52) U.S. Cl. .................... 455/456.1; 704/233; 381/104

(58) Field of Classification Search ................ 455/522, 455/245.1, 563, 69, 24, 414.4, 404.2, 456.1, 455/457, 456, 410, 470, 3.06; 370/288; 381/103, 63, 56–58, 104, 109, 94.1; 386/63; 704/270.1, 246, 211, 231, 274, 251, 270, 704/243, 233, 200; 342/457; 701/211, 207; 379/202
See application file for complete search history.

(56) References Cited

U.S. PATENT DOCUMENTS

| | | | | |
|---|---|---|---|---|
| 5,263,019 A | * | 11/1993 | Chu ........................... 370/288 |
| 5,297,183 A | * | 3/1994 | Bareis et al. ................ 455/410 |
| 5,384,856 A | * | 1/1995 | Kyouno et al. ............. 381/103 |
| 5,384,892 A | * | 1/1995 | Strong ........................ 704/243 |
| 5,406,492 A | * | 4/1995 | Suzuki ........................ 701/211 |
| 5,524,169 A | * | 6/1996 | Cohen et al. ................ 704/231 |
| 5,835,667 A | * | 11/1998 | Wactlar et al. ................ 386/96 |
| 5,953,700 A | * | 9/1999 | Kanevsky et al. ....... 704/270.1 |
| 5,970,446 A | * | 10/1999 | Goldberg et al. ........... 704/233 |
| 5,991,385 A | * | 11/1999 | Dunn et al. ............. 379/202.01 |
| 6,072,881 A | * | 6/2000 | Linder ........................ 381/94.1 |
| 6,111,962 A | * | 8/2000 | Akio ............................ 381/63 |
| 6,112,174 A | * | 8/2000 | Wakisaka et al. ........... 704/251 |

(Continued)

FOREIGN PATENT DOCUMENTS

EP 1 326 232 A2 7/2003

(Continued)

OTHER PUBLICATIONS

U. Ko, et al., *DSP for Third Generation Wireless Communications*, Computer Design, 1999. Intl. Conference in Austin, TX, Oct. 1999, Los Alamitos, CA, IEEE Comput. Soc., US, Oct. 10, 1999, pp. 516-520.

(Continued)

*Primary Examiner*—Erika A. Gary
*Assistant Examiner*—Kiet Doan
(74) *Attorney, Agent, or Firm*—Trop, Pruner & Hu, P.C.

(57) ABSTRACT

Speech recognition in mobile processor-based devices may be improved by using location information. Location information may be derived from on-board hardware or from information provided remotely. The location information may assist in a variety of ways in improving speech recognition. For example, the ability to adapt to the local ambient conditions, including reverberation and noise characteristics, may be enhanced by location information. In some embodiments, pre-developed models or context information may be provided from a remote server for given locations.

30 Claims, 3 Drawing Sheets

U.S. PATENT DOCUMENTS

| | | | |
|---|---|---|---|
| 6,125,115 A * | 9/2000 | Smits | 370/389 |
| 6,223,156 B1 * | 4/2001 | Goldberg et al. | 704/247 |
| 6,236,365 B1 * | 5/2001 | LeBlanc et al. | 342/457 |
| 6,349,303 B1 * | 2/2002 | Saito | 707/101 |
| 6,449,593 B1 * | 9/2002 | Valve | 704/233 |
| 6,529,871 B1 * | 3/2003 | Kanevsky et al. | 704/246 |
| 6,574,601 B1 * | 6/2003 | Brown et al. | 704/270.1 |
| 6,615,171 B1 * | 9/2003 | Kanevsky et al. | 704/246 |
| 6,785,647 B2 * | 8/2004 | Hutchison | 704/231 |
| 6,810,380 B1 * | 10/2004 | Roberts et al. | 704/270 |
| 6,853,907 B2 * | 2/2005 | Peterson et al. | 701/207 |
| 6,859,777 B2 * | 2/2005 | Krasle | 704/270.1 |
| 6,961,706 B2 * | 11/2005 | Saito | 704/275 |
| 6,978,159 B2 * | 12/2005 | Feng et al. | 455/570 |
| 2001/0056350 A1 * | 12/2001 | Calderone et al. | 704/270 |
| 2002/0072917 A1 * | 6/2002 | Irvin et al. | 704/270.1 |
| 2002/0097884 A1 * | 7/2002 | Cairns | 381/71.4 |
| 2002/0168986 A1 * | 11/2002 | Lau et al. | 455/456 |
| 2003/0040903 A1 * | 2/2003 | Gerson | 704/211 |
| 2003/0060211 A1 * | 3/2003 | Chern et al. | 455/456 |
| 2005/0182558 A1 * | 8/2005 | Maruta | 701/200 |

FOREIGN PATENT DOCUMENTS

| | | | |
|---|---|---|---|
| JP | P2001-125584 A | * | 10/1999 |
| KR | 10-2002-0006357 | | 1/2002 |
| WO | WO 97/50002 | * | 12/1997 |
| WO | WO 00/41403 | | 7/2000 |

OTHER PUBLICATIONS

J. Droppo et al., *Efficient On-Line Acoustic Environment Estimation For FCDCN In A Continuous Speech Recognition System*, Intl. Conference on Acoustics, Speech and Signal Processing 2001, Salt Lake City, pp. 209-212.

* cited by examiner

SPEECH RECOGNITION OF MOBILE DEVICES

BACKGROUND

This invention relates generally to mobile processor-based systems that include speech recognition capabilities.

Mobile processor-based systems include devices such as handheld devices, personal digital assistants, digital cameras, laptop computers, data input devices, data collection devices, remote control units, voice recorders, and cellular telephones, to mention a few examples. Many of these devices may include speech recognition capabilities.

With speech recognition, the user may say words that may be converted to text. As another example, the spoken words may be received as commands that enable selection and operation of the processor-based system's capabilities.

In a number of cases, the ability of a given device to recognize speech or identify a speaker is relatively limited. A variety of ambient conditions may adversely affect the quality of the speech recognition or speaker identification. Because the ambient conditions may change unpredictably, the elimination of ambient effects is much more difficult with mobile speech recognition platforms.

Thus, there is a need for better ways to enable speech recognition with mobile processor-based systems.

DETAILED DESCRIPTION

Figure 1:
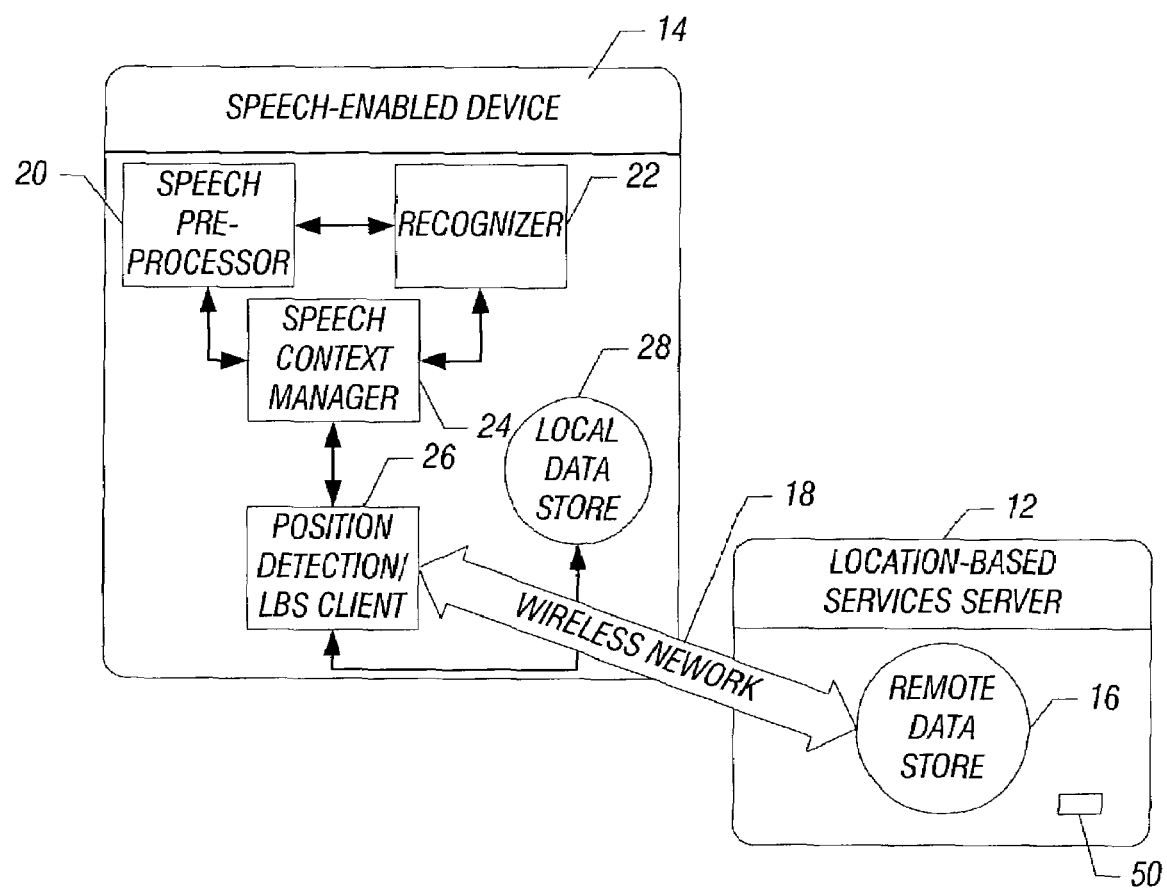
FIG. 1 is a schematic depiction of one embodiment of the present invention.

Referring to FIG. 1, a speech enabled mobile processor-based system 14 may be any one of a variety of mobile processor-based systems that generally are battery powered. Examples of such devices include laptop computers, personal digital assistants, cellular telephones, digital cameras, data input devices, data collection devices, appliances, and voice recorders, to mention a few examples.

By incorporating a position detection capability within the device 14, the ability to recognize spoken words may be improved in the variety of environments or ambient conditions. Thus, the device 14 may include a position detection or location-based services (LBS) client 26. Position detection may be accomplished using a variety of technologies such as global positioning satellites, hot-spot detection, cell detection, radio triangulation, or other techniques.

A variety of aspects of location may be used to improve speech recognition. The physical location of the system 14 may provide information about acoustic characteristics of the surrounding space. Those characteristics may include the size of the room, noise sources, such as ventilation ducts or exterior windows, and reverberation characteristics.

This data can be stored in a network infrastructure, such as a location-based services (LBS) server 12. For frequently visited locations, the characteristics may be stored in the system 14 data store 28 itself. The server 12 may be coupled to the system 14 through a wireless network 18 in one embodiment of the present invention.

Other aspects of location that may be leveraged to improve speech recognition include the physical location of nearby speakers who are using comparable systems 14. These speakers may be potential sources of interference and can be identified based on their proximity to the user of the system 14. In addition, the identity of nearby people who are carrying comparable systems 14 may be inferred by subscribing to their presence information or by ad hoc discovery peers. Also, the orientation of the system 14 may be determined and this may provide useful information for improving speech recognition.

The system 14 includes a speech context manager 24 that is coupled to the position detection/location-based services client 26, a speech recognizer 22, and a noise mitigating speech preprocessor 20.

When speech recognition is attempted by the system 14, the speech context manager 24 retrieves a current context from the server 12 in accordance with one embodiment of the present invention. Based on the size of the surrounding space, the context manager 24 adjusts the acoustic models of the recognizer 22 to account for reverberation.

This adjustment may be done in a variety of ways including using model adaptation, such as maximum likelihood linear regression to a known target. The target transformation may have been estimated in a previous encounter at that position or may be inferred from the reverberation time associated with the space. The adjustment may also be done by selecting from a set of previously trained acoustic models that match various acoustic spaces typically encountered by the user.

As another alternative, the context manager 24 may select from among feature extraction and noise reduction algorithms that are resistant to reverberation based on the size of the acoustic space. The acoustic models may also be modified to match the selected front-end noise reduction and feature extraction. Models may also be adapted based on the identity of nearby people, retrieving and loading speaker dependent acoustic models for each person, if available. Those models may be used for automatic transcription of hallway discussion in one embodiment of the present invention.

Another way that the adjustment may be done is by initializing and adapting a new acoustic model if the acoustic space has not been encountered previously. Once the location is adequately modeled, the system 14 may send the information to the server 12 to be stored in the remote data store 16 for future visitors to the same location.

As another example of adaptation, based on the identity of nearby speakers, the system 14 may assist the user to identify them as a transcription source. A transcription source is someone whose speech should be transcribed. A list of potential sources in the vicinity of the user may be presented to the user. The user may select the desired transcription sources from the list in one embodiment.

As still another example, based on the orientation of the system 10, the location of proximate people, and their designation as transcription sources, a microphone array controlled by preprocessor 20 may be configured to place nulls in the direction of the closest persons who are not transcription sources. Since that direction may not be highly accurate and is subject to abrupt change, this method may not supplant interferer tracking via a microphone array. However, it may provide a mechanism to place the nulls when the interferer is not speaking, thereby significantly improving performance when an interferer talker starts to speak.

Figure 2:
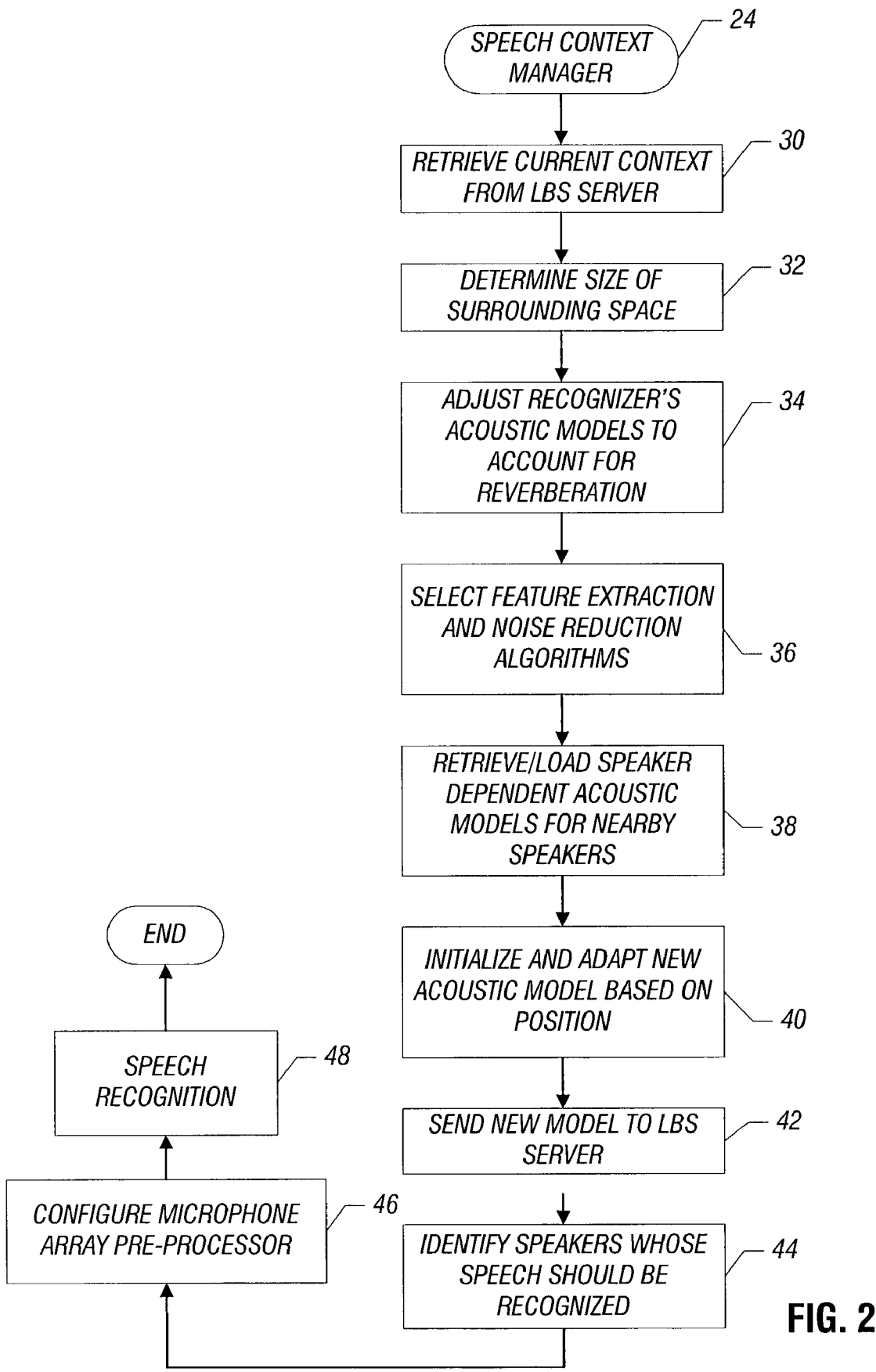
FIG. 2 is a flow chart useful with the embodiment shown in FIG. 1 in accordance with one embodiment of the present invention.

Referring to FIG. 2, in accordance with one embodiment of the present invention, the speech context manager 24 may be a processor-based device including both a processor and storage for storing instructions to be executed on the processor. Thus, the speech context manager 24 may be software or hardware. Initially, the speech context manager 24 retrieves a current context from the server 12, as indicated in block 30. Then the context manager 24 may determine the size of the surrounding space proximate to the device 14, as indicated in block 32. The device 14 may adjust the recognizer's acoustic models to account for local reverberation, as indicated in block 34.

Then feature extraction and noise reduction algorithms may be selected based on the understanding of the local environment, as indicated in block 36. In addition, the speaker-dependent acoustic models for nearby speakers may be retrieved and loaded, as indicated in block 38. These models may be retrieved, in one embodiment, from the server 12.

New acoustic models may be developed based on the position of the system 14 as detected by the position detection/LBS client 26, as indicated in block 40. The new model, linked to position coordinates, may be sent over the wireless network 18 to the server 12, as indicated in block 42, for potential future use. In some embodiments, models may be available from the server 12 and, in other situations, those models may be developed by a system 14 either on its own or in cooperation with the server 12 for immediate dynamic use.

As indicated in block 44, any speakers whose speech should be recognized may be identified. The microphone array preprocessor 20 may be configured, as indicated in block 46. Then speech recognition may be implemented, as indicated in block 48, having obtained the benefit of the location information.

Figure 3:
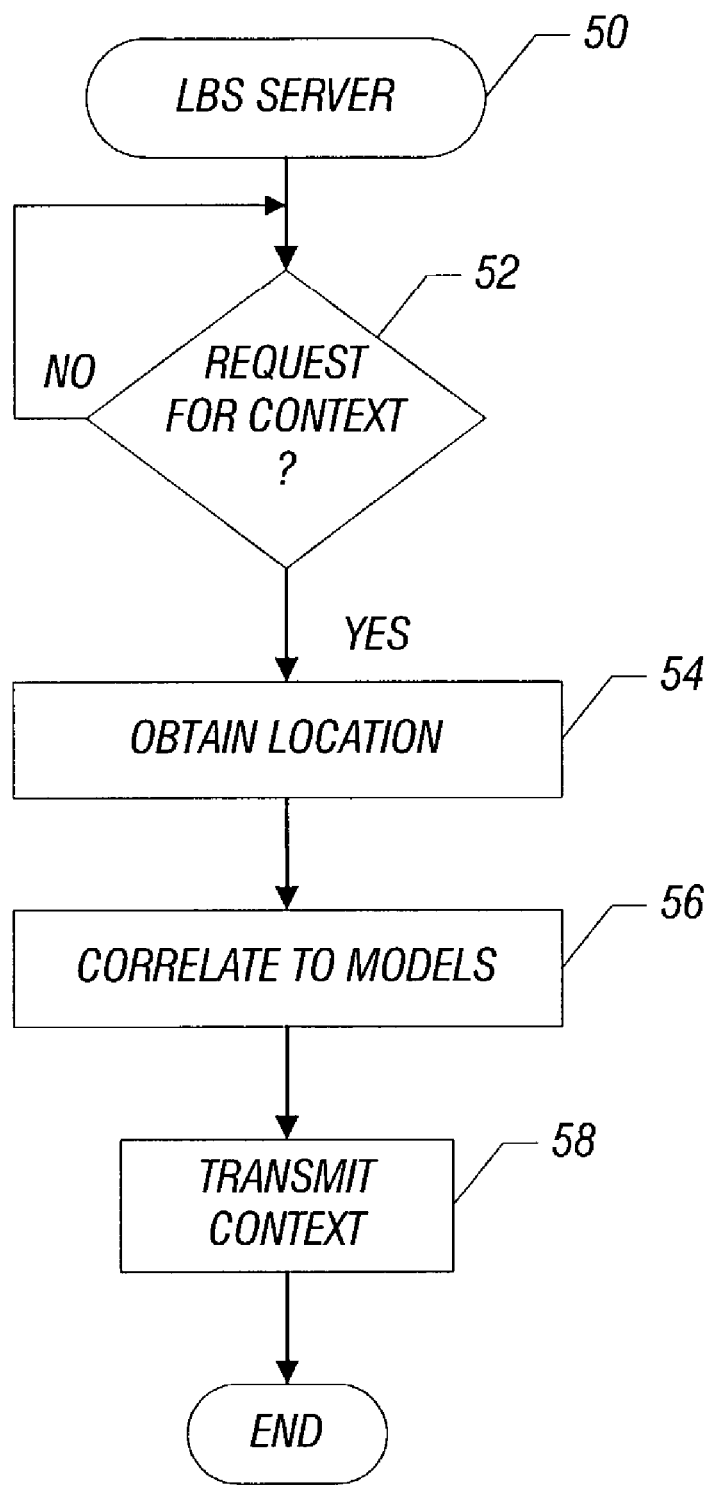
FIG. 3 is a flow chart useful with the embodiment shown in FIG. 1 in accordance with one embodiment of the present invention.

Referring to FIG. 3, the LBS server 12 may be implemented through software 50 in accordance with one embodiment of the present invention. The software 50 may be stored in an appropriate storage on the server 12. Initially, the server 12 receives a request for context information from a system 14, as determined in diamond 52. Once received, the server 12 obtains the location information from the system 14, as indicated in block 54. The location information may then be correlated to available models in the data storage 16, as indicated in block 56. Once an appropriate model is identified, the context may be transmitted to the device 14 over the wireless network, as indicated in block 58.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   obtaining location information for a first speaker from a first position determining device;
   obtaining location information for a second speaker from a second position determining device; and
   using said location information to provide information about the acoustic characteristics of the space surrounding the location of the first device for speech recognition and to cancel the effect of speech by the second speaker on recognition of speech by the first speaker.

2. The method of claim 1 including obtaining an acoustic model linked to a particular location for use in improving speech recognition.

3. The method of claim 2 including receiving said model from a remote server over a wireless network.

4. The method of claim 2 including tailoring the acoustic model based on local characteristics.

5. The method of claim 4 including transmitting said model together with position coordinates to a remote server.

6. The method of claim 1 wherein obtaining location information includes obtaining information about the size of a surrounding space.

7. The method of claim 1 wherein obtaining location information includes adjusting an acoustic model to account for reverberation.

8. The method of claim 1 wherein obtaining location information includes selecting feature extraction or noise reduction algorithms.

9. The method of claim 1 wherein obtaining location information includes obtaining information about nearby speakers.

10. The method of claim 1 wherein obtaining location information includes obtaining information about the size of the surrounding space, obtaining information about reverberation, selecting noise reduction algorithms, and obtaining information about nearby speakers to develop a new acoustic model for the current location.

11. The method of claim 1 including configuring a microphone array based on the location of nearby speakers whose speech is not to be recognized.

12. An article comprising a computer storable medium storing instructions that, if executed, enable a processor-based system to perform the steps of:
   receiving location information for a first speaker from a first position determining device;
   receiving location information for a second speaker from a second position determining device; and
   using said location information to provide information about the acoustic characteristics of the space surrounding the location of the first device for speech recognition and to cancel the effect of speech by the second speaker on recognition of speech by the first speaker.

13. The article of claim 12 further storing instructions that, if executed, enable the processor-based system to perform the step of obtaining an acoustic model linked to a particular location for use in improving speech recognition.

14. The article of claim 13 further storing instructions that, if executed, enable the processor-based system to perform the step of receiving said model from a remote server over a wireless network.

15. The article of claim 13 further storing instructions that, if executed, enable the processor-based system to perform the step of tailoring the acoustic model based on local characteristics.

16. The article of claim 15 further storing instructions that, if executed, enable the processor-based system to perform the step of transmitting said model together with position coordinates to a remote server.

17. The article of claim 12 further storing instructions that, if executed, enable the processor-based system to perform the step of obtaining location information by obtaining information about the size of a surrounding space.

18. The article of claim 12 further storing instructions that, if executed, enable the processor-based system to perform the step of obtaining location information by adjusting an acoustic model to account for reverberation.

19. The article of claim 12 further storing instructions that, if executed, enable the processor-based system to perform the step of obtaining location information by selecting feature extraction or noise reduction algorithms.

20. The article of claim 12 further storing instructions that, if executed, enable the processor-based system to perform the step of obtaining location information by obtaining information about nearby speakers.

21. The article of claim 12 further storing instructions that, if executed, enable the processor-based system to perform the steps of obtaining location information by obtaining information about the size of the surrounding space, obtaining information about reverberation, selecting noise reduction algorithms, and obtaining information about nearby speakers to develop a new acoustic model for the current location.

22. The article of claim 12 further storing instructions that, if executed, enable the processor-based system to perform the step of configuring a microphone array based on the location of nearby speakers whose speech is not to be recognized.

23. A system comprising:
a processor;
a first position determining device coupled to said processor;
a second position determining device coupled to said processor, and
a storage coupled to said processor storing instructions that enable the processor to use information from said position determining device to provide information about the acoustic characteristics of the space surrounding the location of the first device for speech recognition and to cancel the effect of speech by the second speaker on recognition of speech by the first speaker.

24. The system of claim 23 wherein said position locating device is a global positioning satellite device.

25. The system of claim 23 wherein said storage stores instructions that enable the processor to obtain an acoustic model linked to a particular location for use in improving speech recognition.

26. The system of claim 25 wherein said storage stores instructions to receive a model from a remote server over a wireless network.

27. The system of claim 24 wherein said system automatically tailors an acoustic model for a particular location and transmits that model together with position coordinates to a remote server.

28. The system of claim 23 wherein said system automatically obtains information about the size of a space surrounding said system.

29. The system of claim 23 wherein said system automatically obtains information about nearby speakers.

30. The system of claim 29 wherein said system includes a microphone array and automatically configures said microphone array based on the location of nearby speakers.

* * * * *